(12) United States Patent
Yamazaki et al.

(10) Patent No.: US 11,413,597 B2
(45) Date of Patent: Aug. 16, 2022

(54) POLYMERIZATION APPARATUS

(71) Applicant: Tokuyama Dental Corporation, Tokyo (JP)

(72) Inventors: Tatsuya Yamazaki, Tokyo (JP); Masaki Kinoshita, Tokyo (JP)

(73) Assignee: Tokuyama Dental Corporation, Tokyo (JP)

( * ) Notice: Subject to any disclaimer, the term of this patent is extended or adjusted under 35 U.S.C. 154(b) by 0 days.

(21) Appl. No.: 17/255,295

(22) PCT Filed: Aug. 15, 2019

(86) PCT No.: PCT/JP2019/032059
§ 371 (c)(1),
(2) Date: Dec. 22, 2020

(87) PCT Pub. No.: WO2020/040039
PCT Pub. Date: Feb. 27, 2020

(65) Prior Publication Data
US 2021/0260559 A1 Aug. 26, 2021

(30) Foreign Application Priority Data

Aug. 24, 2018 (JP) .............................. JP2018-156877
Aug. 27, 2018 (JP) .............................. JP2018-158179
Mar. 28, 2019 (JP) .............................. JP2019-062361

(51) Int. Cl.
*A61C 13/16* (2006.01)
*A61C 19/00* (2006.01)
(Continued)

(52) U.S. Cl.
CPC ........... *B01J 19/122* (2013.01); *A61C 19/003* (2013.01); *B01J 19/06* (2013.01); *B29C 35/002* (2013.01);
(Continued)

(58) Field of Classification Search
CPC ....... A61C 13/00; A61C 13/08; A61C 13/087; A61C 13/14; A61C 13/16; A61C 19/00;
(Continued)

(56) References Cited

U.S. PATENT DOCUMENTS 5,040,964 A 8/1991 Oppawsky et al.
5,958,468 A 9/1999 Kunkel et al.
(Continued)

FOREIGN PATENT DOCUMENTS

CN 106660277 A 5/2017
CN 106794054 A 5/2017
(Continued)

OTHER PUBLICATIONS

International Search Report dated Oct. 8, 2019 in Inte PCT/JP2019/032059.
(Continued)

*Primary Examiner* — Natasha E Young
(74) *Attorney, Agent, or Firm* — Saliwanchik, Lloyd & Eisenschenk (57) ABSTRACT

A polymerization apparatus according to an embodiment of the present invention includes: a light irradiator; and a polymerization vessel. The light irradiator includes a first casing and a light source assembly. The first casing includes a light source chamber defined by cylindrical side walls, a ceiling, and a floor including a light-transmissive window member. The light source assembly includes a base having a light-emitting surface on which a plurality of light-emitting diodes is disposed in a predetermined pattern and a heat-dissipating surface to which a heat sink is joined, and the light source assembly is disposed within the light source chamber so that the light-emitting surface faces the light-transmissive window member. The polymerization vessel includes a polymerization cup and a second casing. The
(Continued)

polymerization cup has a frustoconical or substantially frustoconical shape that opens upward and increases in diameter upward, and is capable of housing an object therein. The second casing is a bottomed cylindrical or box-shaped casing having an opening at the apex thereof, the polymerization cup being attachably/detachably housed in the second casing via the opening. In this polymerization apparatus, light that has been emitted by the plurality of light-emitting diodes of the light irradiator and has passed through the light-transmissive window member is applied to the inside of the polymerization cup of the polymerization vessel.

7 Claims, 5 Drawing Sheets

(51) Int. Cl.
| | | |
|---|---|---|
| *A61K 6/884* | (2020.01) | |
| *B01J 19/00* | (2006.01) | |
| *B01J 19/06* | (2006.01) | |
| *G03F 7/00* | (2006.01) | |
| *B01J 19/12* | (2006.01) | |
| *A61C 13/15* | (2006.01) | |
| *B29C 35/00* | (2006.01) | |
| *B29C 35/08* | (2006.01) | |
| *B29L 31/00* | (2006.01) | |

(52) U.S. Cl.
CPC ... *B29C 35/0805* (2013.01); *B01J 2219/0871* (2013.01); *B01J 2219/1203* (2013.01); *B29L 2031/7536* (2013.01)

(58) Field of Classification Search
CPC .......... A61C 19/003; A61K 6/00; A61K 6/80; A61K 6/884; B01J 19/06; B01J 19/12–123; B01J 2219/00; B01J 2219/08; B01J 2219/0871; B01J 2219/12; B01J 2219/1203; B29C 35/002; B29C 35/0288; B29C 35/0805; B29C 2035/0827; B29C 2035/0833; B29C 2037/90; B29K 2033/00; B29K 2033/04; B29K 2033/08; B29L 2031/00; B29L 2031/753; B29L 2031/7532; B29L 2031/7536; G03F 7/00; G03F 7/0037
See application file for complete search history.

(56) References Cited

U.S. PATENT DOCUMENTS

| | | |
|---|---|---|
| 7,275,931 B2 | 10/2007 | Katsuda et al. |
| 2003/0228243 A1 | 12/2003 | Clark |
| 2004/0238111 A1 | 12/2004 | Siegel |
| 2005/0205882 A1 | 9/2005 | Condon |
| 2010/0252753 A1 | 10/2010 | Wang et al. |
| 2017/0246796 A1 | 8/2017 | Bauer et al. |
| 2017/0252138 A1 | 9/2017 | Noguchi et al. |
| 2019/0091000 A1* | 3/2019 | Kubiak-Essmann ........................ A61C 13/087 |
| 2020/0261196 A1 | 8/2020 | Ruppert et al. |

FOREIGN PATENT DOCUMENTS

| | | | |
|---|---|---|---|
| DE | 196 18 543 A1 | 11/1997 | |
| EP | 2 417 929 A2 | 2/2012 | |
| JP | 62-68452 A | 3/1987 | |
| JP | 5-62219 U | 8/1993 | |
| JP | 2012-034838 A | 2/2012 | |
| JP | 2012-034839 A | 2/2012 | |
| JP | 2014-203646 A | 10/2014 | |
| JP | 2014-226210 A | 12/2014 | |
| JP | 2015-149415 A | 8/2015 | |
| RU | 43450 U1 | 1/2005 | |
| WO | WO-2012/036441 A2 | 3/2012 | |
| WO | WO-2017/102776 A1 | 6/2017 | |
| WO | WO-2017182375 A1 * | 10/2017 | ........... A61C 19/003 |

OTHER PUBLICATIONS

Office Action dated Sep. 29, 2021 in Chinese Application No. 201980052094.8.
Office Action dated Sep. 22, 2021 in Indian Application No. 202127012340.
Office Action dated Jun. 8, 2021 in Russian Application No. 2021107531/14(016293), along with its English translation.
Office Action dated Mar. 31, 2022 in Canadian Application No. 3,108,456.
Supplementary European Search Report dated Apr. 21, 2022 in European Application No. 19851527.2.

* cited by examiner

POLYMERIZATION APPARATUS

CROSS-REFERENCE TO RELATED APPLICATIONS

This application is the U.S. national stage application of International Patent Application No. PCT/JP2019/032059, now WO 2020/040039, filed Aug. 15, 2019, which claims the benefit under 35 U.S.C. § 119 of Japanese Patent Application Nos. 2018-156877, filed Aug. 24, 2018; 2018-158179, filed Aug. 27, 2018; and 2019-062361, filed Mar. 28, 2019, the disclosures of each of which are incorporated herein by reference in their entirety.

TECHNICAL FIELD

The present invention relates to a polymerization apparatus. More particularly, the present invention relates to a photopolymerization apparatus that can be suitably used for producing dentures, dental prostheses, and the like by photopolymerization.

BACKGROUND ART

In the past, as a photopolymerizer used to proceed photopolymerization of a preliminary molded body formed of a photocurable material in an uncured state, a photopolymerizer in which the preliminary molded body is placed in a polymerization vessel and light is applied from a light source into the polymerization vessel has been known.

For example, as a photopolymerizer that cures an object formed of a photocurable material used in dental prostheses, etc. by a light-emitting diode (LED) light source and is capable of increasing the hardness (strength) thereof by increasing the temperature in the light irradiation space (polymerization space), "a photopolymerizer including a casing; a polymerization space formed by being surrounded by a wall in the casing, polymerization being performed in the polymerization space; and a LED light source that applies light for polymerization into the polymerization space, the photopolymerizer being characterized in that the LED light source is disposed outside the polymerization space" is disclosed in Patent Literature 1. Then, in accordance with Patent Literature 1, the photopolymerizer further includes a temperature control means for heating the inside of the polymerization space, the temperature control means includes a cooling means for cooling the LED light source, and a heat supply means for supplying heat generated from the LED light source through the cooling means to the polymerization space, and heat generated from the LED light source heats the polymerization space. Further, the photopolymerizer includes a table rotatable by a motor, and uniform polymerization is enabled by placing a dental prosthesis or the like on the table via a dedicated attachment and causing the attachment, dental prosthesis, and the like to rotate.

Meanwhile, in recent years, home-visit medical care has attracted attention as a form of medical care to cope with an aging society. For example, there is a demand to perform maintenance (repair) of dental prostheses such as a denture (full dentures or partial denture) as part of home-visit medical care, specifically, the operation of shaping and hardening the denture base of an incorrect denture by adding a photopolymer material thereto, thereby fitting the denture in the oral cavity. Then, a polymerization apparatus that meets such a demand is also known. That is, as a photopolymerization container that can be attachably/detachably provided with a light source such as a handpiece type photopolymerizer and is easy to carry, "a photopolymerization container including: a container that can be removed, a dental prosthesis being placed in the container; and a light guide portion that penetrates the wall of the container so as to allow light to pass therethrough and communicates with the inside and outside of the container" is disclosed in Patent Literature 2.

CITATION LIST

Patent Literature

Patent Literature 1: Japanese Patent Application Laid-open No. 2012-034839
Patent Literature 2: Japanese Patent Application Laid-open No. 2012-034838
Patent Literature 3: Japanese Patent Application Laid-open No. 1987-68452

DISCLOSURE OF INVENTION

Technical Problem

The above-mentioned photopolymerizer disclosed in Patent Literature 1 is advantageous in the case of polymerizing an object that needs to be heated at the time of polymerization because not only an LED, which has a long service life, is used as a light source but also the photopolymerizer includes a temperature control means. However, the configuration of the above-mentioned temperature control mean is complicated, e.g., the temperature control means requires a Peltier device for cooling and an air passage leading to a polymerizing space, and the table and a motor for causing the table to rotate are mounted thereon, which increases the size of the device. Therefore, it is difficult to say that the above-mentioned polymerization apparatus is suitable for the denture repair at the time of the home-visit medical care as described above.

Although the above-mentioned photopolymerization container disclosed in Patent Literature 2 has the advantage of being easy to carry, since a handpiece type photopolymerizer, which is close to a point light source (has a very small area of the light-emitting surface), is used as a light source, there are problems that it is necessary to diffuse light using a diffusion lens or the like in order to perform light irradiation on a large area, and the intensity of the light applied per unit area of an object becomes low.

In this regard, it is an object of the present invention to provide a small polymerization apparatus that is easy to carry, which is capable of increasing the intensity of light applied per unit area of an object.

Solution to Problem

A polymerization apparatus according to an embodiment of the present invention is a polymerization apparatus that includes: a light irradiator; and a polymerization vessel, the polymerization apparatus being for polymerizing an unpolymerized portion formed of a photopolymerization curable composition by applying light emitted from the light irradiator to "an object that includes a member or an article having the unpolymerized portion" housed inside the polymerization vessel.

The light irradiator includes a first casing and a light source assembly. The first casing includes a light source chamber defined by cylindrical side walls, a ceiling, and a floor including a light-transmissive window member, an intake hole and an exhaust hole being provided on the side walls. The light source assembly includes a base having a light-emitting surface on which a plurality of light-emitting diodes is disposed in a predetermined pattern and a heat-dissipating surface to which a heat sink is joined, and the light source assembly is disposed within the light source chamber so that the light-emitting surface faces the light-transmissive window member.

The polymerization vessel includes a polymerization cup and a second casing. The polymerization cup has a frustoconical or substantially frustoconical shape that opens upward and increases in diameter upward, and is capable of housing an object therein. The second casing is a bottomed cylindrical or box-shaped casing having an opening at the apex thereof, the polymerization cup being attachably/detachably housed in the second casing via the opening.

In the polymerization apparatus, light that has been emitted by the plurality of light-emitting diodes of the light irradiator and has passed through the light-transmissive window member is applied to the inside of the polymerization cup of the polymerization vessel.

In accordance with the above-mentioned polymerization apparatus, since an LED is used as a light source, it can be made compact and is easy to carry. Therefore, it can be suitably used for denture repair and the like at the time of home-visit medical care. Moreover, since a plurality of LEDs is used as the light source, it is possible to irradiate the surface of an object such as the preliminary molded body of the denture with light with high intensity.

The heat sink may further include a plurality of heat-dissipating fins disposed in parallel at predetermined intervals to form a groove-like air passage between the heat-dissipating fins adjacent to each other. Further, the light irradiator may further include an intake fan disposed within the light source chamber so as to face the intake hole and an exhaust fan disposed within the light source chamber so as to face the exhaust hole, the intake fan being disposed to face one end of the air passage, the exhaust fan being disposed to face the other end of the air passage.

As a result, since the airflow can be regulated when the intake fan and the exhaust fan are driven, it is possible to inhibit adverse effects on the device for controlling LEDs due to retention of heated air in the device and non-uniformity of polymerizations due to non-uniformity of temperatures in the polymerization vessel.

The light irradiator may further include a light-transmissive protective film covering an externally exposed portion of the light source chamber in the light-transmissive window member.

As a result, the device can be kept in a favorably state simply and at low cost even in the case where the present invention was applied to an object including a member or an article having an unpolymerized portion formed of a photopolymerization curable composition containing a monofunctional polymerizable monomer having a molecular weight of 200 or less.

The polymerization cup may be a disposable cup having at least an inner surface formed of a material that reflects light emitted from the light-emitting diodes.

A cross section of a cylindrical side chamber of the light source chamber may be circular, substantially circular, elliptical, substantially elliptical, or polygonal.

The light irradiator may further include a control means disposed in the light source chamber from the viewpoint of miniaturization of the device. The control means controls driving of at least one selected from the group consisting of the plurality of light-emitting diodes, the intake fan, and the exhaust fan by using electric power supplied from a battery or an external power source.

The light irradiator and the polymerization vessel may have integration mechanisms that interact to integrate the light irradiator and the polymerization vessel such that an upper end periphery of the polymerization cup overlaps below the light-transmissive window member of the light source chamber with a predetermined distance therebetween. From the viewpoint of making it easier to equalize the temperatures in the polymerization vessel, the integration mechanisms may be contact portions of the light irradiator and the polymerization vessel when the light irradiator and the polymerization vessel are integrated, each of the contact portions being formed of a non-metallic material.

Advantageous Effects of Invention

In accordance with the present invention, since it is compact and easy to carry, it can be suitably used for denture repair at the time of home-visit medical care. Moreover, since a plurality of LEDs is used as the light source, it is possible to irradiate the surface of an object such as a preliminary molded body of the denture with light with high intensity.

MODE(S) FOR CARRYING OUT THE INVENTION

The polymerization apparatus according to the present invention is a polymerization apparatus for polymerizing an unpolymerized portion formed of a photopolymerizable composition by applying light to "an object that includes a member or an article having the unpolymerized portion".

Here, the photopolymerization curable composition is not particularly limited and can be used as long as it is a composition containing a radically polymerizable monomer and a photopolymerization initiator, and the photopolymerization curable composition may contain other components such as a filler, a pigment, and a dye, as necessary. Examples of the photopolymerization curable composition that can be suitably used include a photocurable dental polymerizable curable composition that is used as a so-called denture base liner material, a dental composite resin, or the like. Further, a part of the member or article serving as the above-mentioned object only needs to be formed of the above-mentioned photopolymerization curable composition. Examples of such an object include those molded by applying a repair liner material to the denture base of the denture and those molded by applying an indirect composite resin for a dental crown to a model or metal frame in the shape of a tooth.

Further, the light to be applied onto the object is not particularly limited as long as it is light containing light (activation light) of a wavelength that activates a photopolymerization initiator contained in the photopolymerization curable composition, and may be appropriately determined depending on the type of the photopolymerization activator to be used. Typically, visible light of a short wavelength or ultraviolet light is often used.

The polymerization apparatus according to the present invention includes: a particular light irradiator that emits the light (activation light) to the outside; and a particular polymerization vessel that houses an object therein and applies activation light emitted from the light irradiator to the object to polymerize and cure the object.

Hereinafter, referring to the drawings, the structure and the like of the light irradiator and the polymerization vessel, and the structure and the like of the polymerization apparatus according to the present invention will be described in detail. However, the present invention is not limited to the embodiment shown in the drawings.

Figure 1:
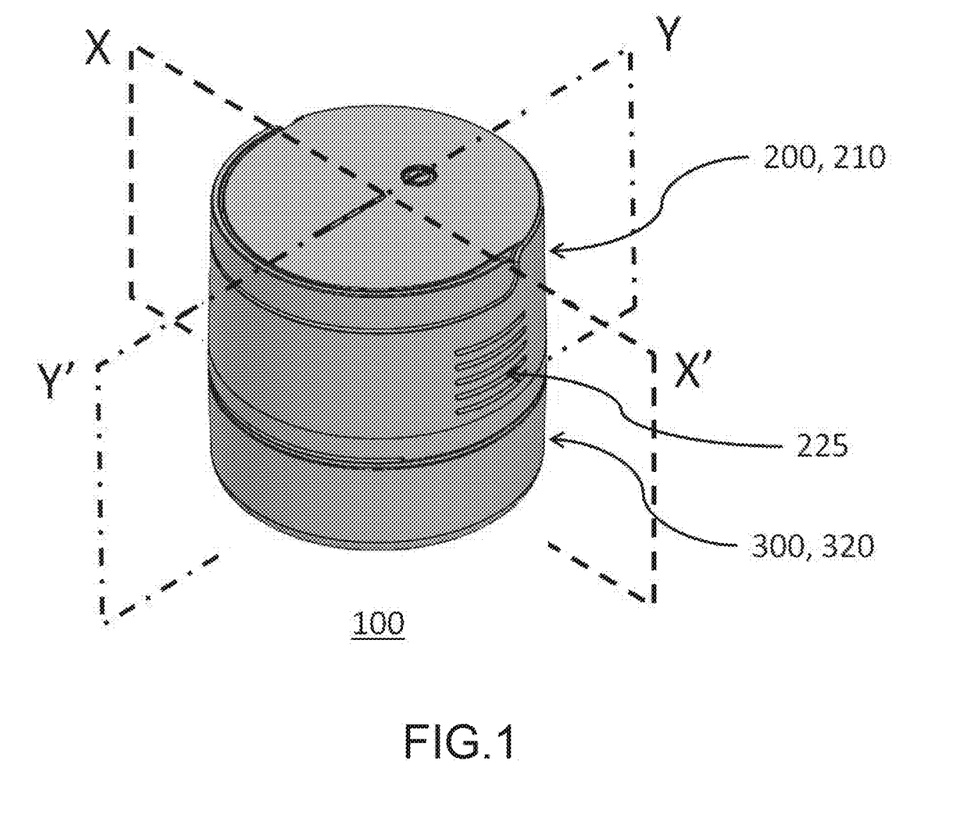
FIG. 1 is a perspective view of a polymerization apparatus according to an embodiment of the present invention.
Figure 2:
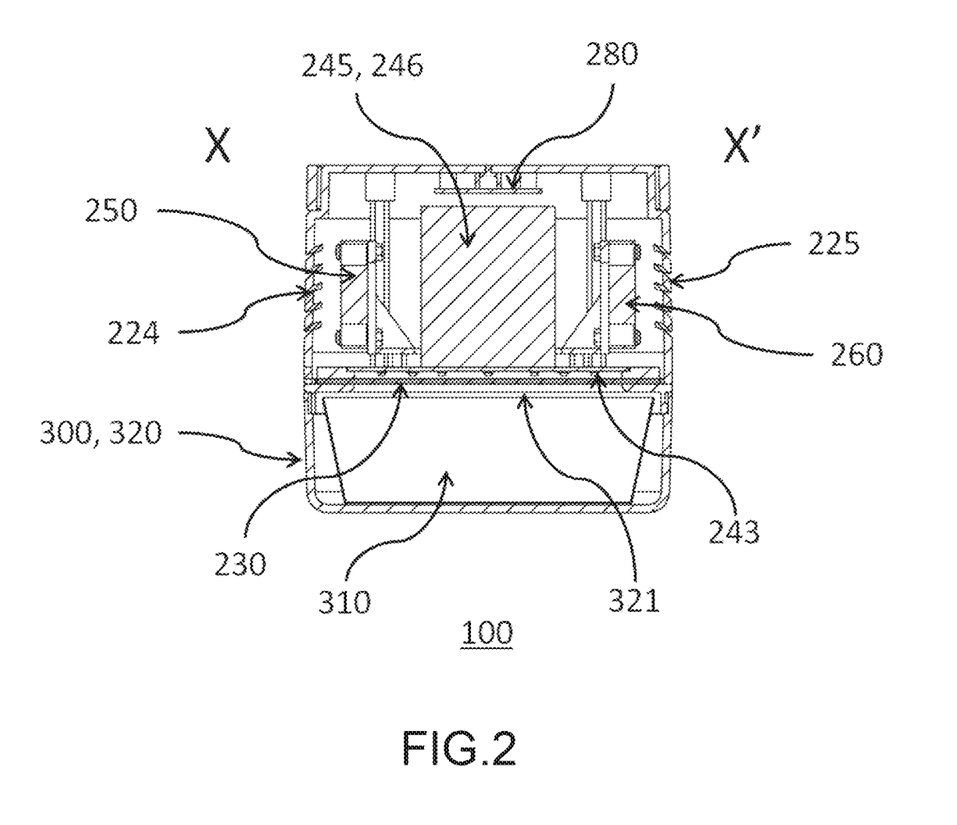
FIG. 2 is a cross-sectional view taken along the line XX' of the polymerization apparatus shown in FIG. 1.
Figure 3:
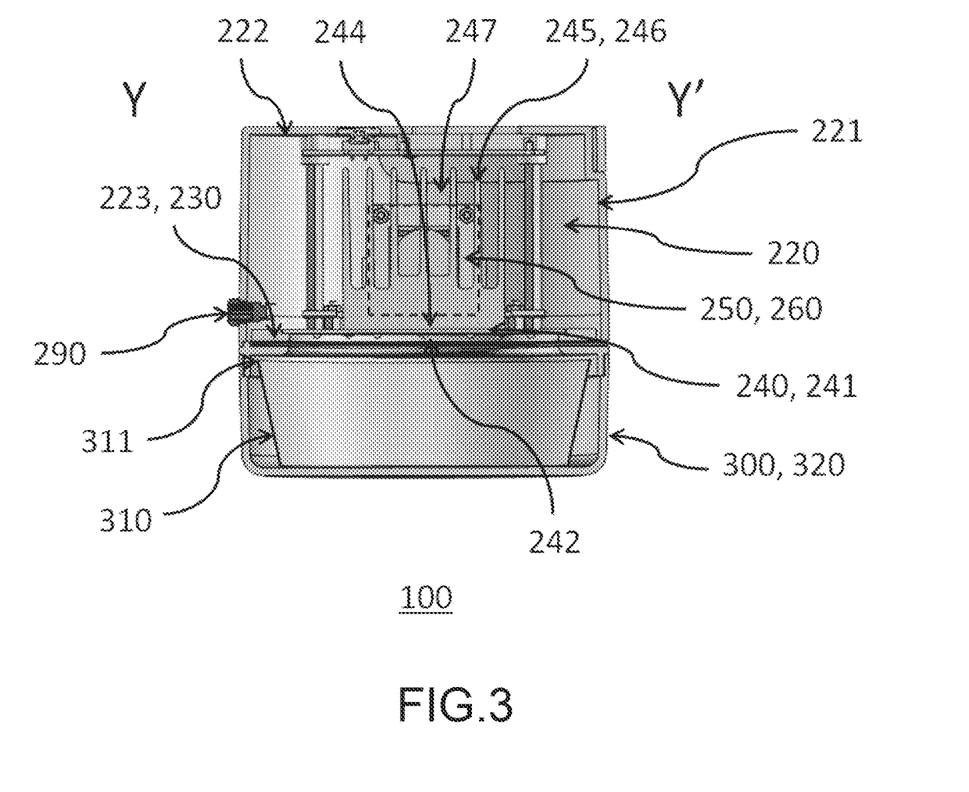
FIG. 3 is a cross-sectional view taken along the line YY' of the polymerization apparatus shown in FIG. 1.

As shown in FIG. 1 to FIG. 3, a polymerization apparatus 100 according to the present invention includes a light irradiator 200 and a polymerization vessel 300.

The light irradiator 200 includes a first casing 210 including a light source chamber 220 defined by cylindrical side walls 221, a circular ceiling 222, and a floor 223a including a circular light-transmissive window member 230, a plurality of slit-shaped intake holes 224 and a plurality of slit-shaped exhaust holes 225 being provided on the side walls 221. Then, a light source assembly 240, an intake fan 250, an exhaust fan 260, and a control substrate 280 (control means) are disposed inside the light source chamber 220.

As the material of the first casing 210 (the side walls 221, the ceiling 222, and portions of the floor 223 other than the light-transmissive window member 230, and the like), synthetic resins, metals, ceramics, or the like can be used. It is suitable to use a resin material such as an acrylonitrile-butadiene-styrene copolymer resin (ABS), polypropylene (PP), polycarbonate (PC), polyoxymethylene (POM), polyamide (PA), polybutylene terephthalate (PBT), polyvinyl chloride (PVC), polyethylene terephthalate (PET), polyethylene naphthalate (PEN), polyethylene (PE), polystyrene (PS), and polymethyl methacrylate (PMMA) because industrial mass production is easy. Further, the light-transmissive window member 230 is not particularly limited as long as it transmits the activation light emitted from a light-emitting diode (LED) 243, which will be described below, and favorably the transmittance of the activation light is 80% or more. In the case where the activation light is visible light having a wavelength of 380 nm to 500 nm or ultraviolet light, a plate body having a thickness of 1 mm to 10 mm, favorably 2 mm to 5 mm, formed of a material such as glass, PC, PMMA, PET, PEN, PVC, PA, and PS is favorably used. Note that the area of the light-transmissive window member 230 is favorably from 20 cm$^2$ to 225 cm$^2$ (from approximately 5 cm to approximately 17 cm in diameter in the case where the window shape is circular), particularly from 50 cm$^2$ to 170 cm$^2$ (from approximately 8 cm to approximately 15 cm in diameter in the case where the window shape is circular) from the viewpoint that the device can be miniaturized and that sufficient light can be applied onto the surface of an object such as a denture. Although the entire surface of the floor 223 may be the light-transmissive window member 230, it is favorable that the window material be replaceable. For this purpose, it is favorable that an opening slightly smaller than the light-transmissive window member 230 is provided at the center of the floor 223, and the light-transmissive window member 230 is attachably/detachably fixed by means of screws or bolts and nuts at the edges remaining on the outside of the opening.

By attachably/detachably attaching the light-transmissive window member 230 in this way, favorable optical transparency can be maintained by replacing the light-transmissive window member 230 in the case where the light-transmissive window member 230 is damaged by long-term use or dirt that cannot be easily removed even by cleaning is attached, A protective film 231 may be used to reduce the frequency of replacing the light-transmissive window member 230. In particular, in the case where an object has an unpolymerized portion formed of a polymerizable curable composition containing a monofunctional polymerizable monomer component having a low molecular weight (particularly, a molecular weight of 200 or less) volatilized by heat of polymerization at the time of polymerization curing, the components are scattered as steam by the heat of polymerization generated during photopolymerization to firmly adhere to the light-transmissive window member 230, and thus, contamination is generated in the light-transmissive window member 230. Since the deposits at this time are hardened after adhesion and cannot be easily removed, it is favorable to coat the outer surface of the light-transmissive window member 230 (portions of the light-transmissive window member 230 exposed to the outside of the light source chamber 220) with the protective film 231 for antifouling in the case of polymerizing such an object. By using such a protective film 231, in the case where the light transmittance is lowered by the deposit, only this protective film 231 needs to be replaced, and the labor and costs of replacement can be greatly reduced as compared with replacing the window material.

As such a protective film 231, it is favorable that the transmittance of the activation light is 80% or more, particularly 90% or more. The material and thickness thereof may be appropriately determined such that the light transmittance is in the above-mentioned range in accordance with the wavelength of the activation light, the absorbance therefor, and the like. Note that examples of the material that can be suitably used as the protective film 231 include PE, PP, PET, PEN, PVC, PS, a perfluoroalkoxy resin (PFA), and polyphenylene sulfide (PPS).

Note that examples of the above-mentioned monofunctional polymerizable monomer having a low molecular weight include methyl (meth)acrylate, ethyl (meth)acrylate, propyl (meth)acrylate, isopropyl (meth)acrylate, butyl (meth)acrylate, 2-hydroxyethyl (meth)acrylate, glycidyl (meth)acrylate, methoxyethyleneglycol (meth)acrylate, n-hexyl (meth)acrylate, cyclohexylmethacrylate, tetrahydrofurfuryl (meth)acrylate, 2-(meth)acryloxyethylpropionate, ethoxyethylene glycol (meth)acrylate, dimethylaminoethyl (meth)acrylate, and diethylaminoethyl (meth)acrylate. The content of the monofunctional polymerizable monomer contained in the photopolymerization curable composition is favorably 30% by mass or more and 100% by mass or less, particularly 40% by mass or more and 80% by mass or less with reference to the mass (total mass) of all polymerizable monomers in the photopolymerization curable composition because the above-mentioned contamination at the time of polymerization is likely to occur and the effect of the application of the protective film 231 becomes remarkable.

The protective film 231 is used as a measure for facilitating the maintenance of the device in the case of frequently performing photopolymerization of an object that contains such a monofunctional polymerizable monomer component having a low molecular weight. However, it is needless to say that the protective film 231 may be used in the case where photopolymerization of an object containing no such a monofunctional polymerizable monomer having a low molecular weight is performed.

Further, in order to inhibit a so-called surface unpolymerized layer that is inevitably formed by the influence of atmospheric oxygen or the like during polymerization from being formed, a technology in which polymerization is performed with an object submerged in water or warm water is known (see Patent Literature 3), and water or hot water is injected into a polymerization cup 310 described below in some cases also in the polymerization apparatus according to the present invention. In such cases, it is favorable to hermetically seal the fixing portion with a gasket 232 interposed therebetween so that steam or liquid-state water does not enter the light source chamber 220. The gasket 232 is not particularly limited as long as the fixing portion can be hermetically sealed, but an elastic sealing member formed of fluorine rubber, silicone rubber, nitrile rubber, chloroprene rubber, ethylene propylene rubber, or the like is favorably used.

The light source assembly 240 includes a base 241 having a light-emitting surface 242 facing the outside of the light source chamber 220 and a heat-dissipating surface 244 facing the inside of the light source chamber 220. A plurality of light-emitting diodes (LEDs) 243 is disposed on the light-emitting surface 242 in a predetermined pattern. A heat sink 245 is joined to the heat-dissipating surface 244. The heat sink 245 includes a plurality of heat-dissipating fins 246 disposed in parallel at predetermined intervals, and a groove-like air passage 247 is formed between the heat-dissipating fins 246 adjacent to each other. Then, the light source assembly 240 is disposed so that the light-emitting surface 242 faces the light-transmissive window member 230, and is capable of emitting active light emitted from the plurality of LEDs 243 and transmitted through the light-transmissive window member 230 to the outside.

Figure 5:
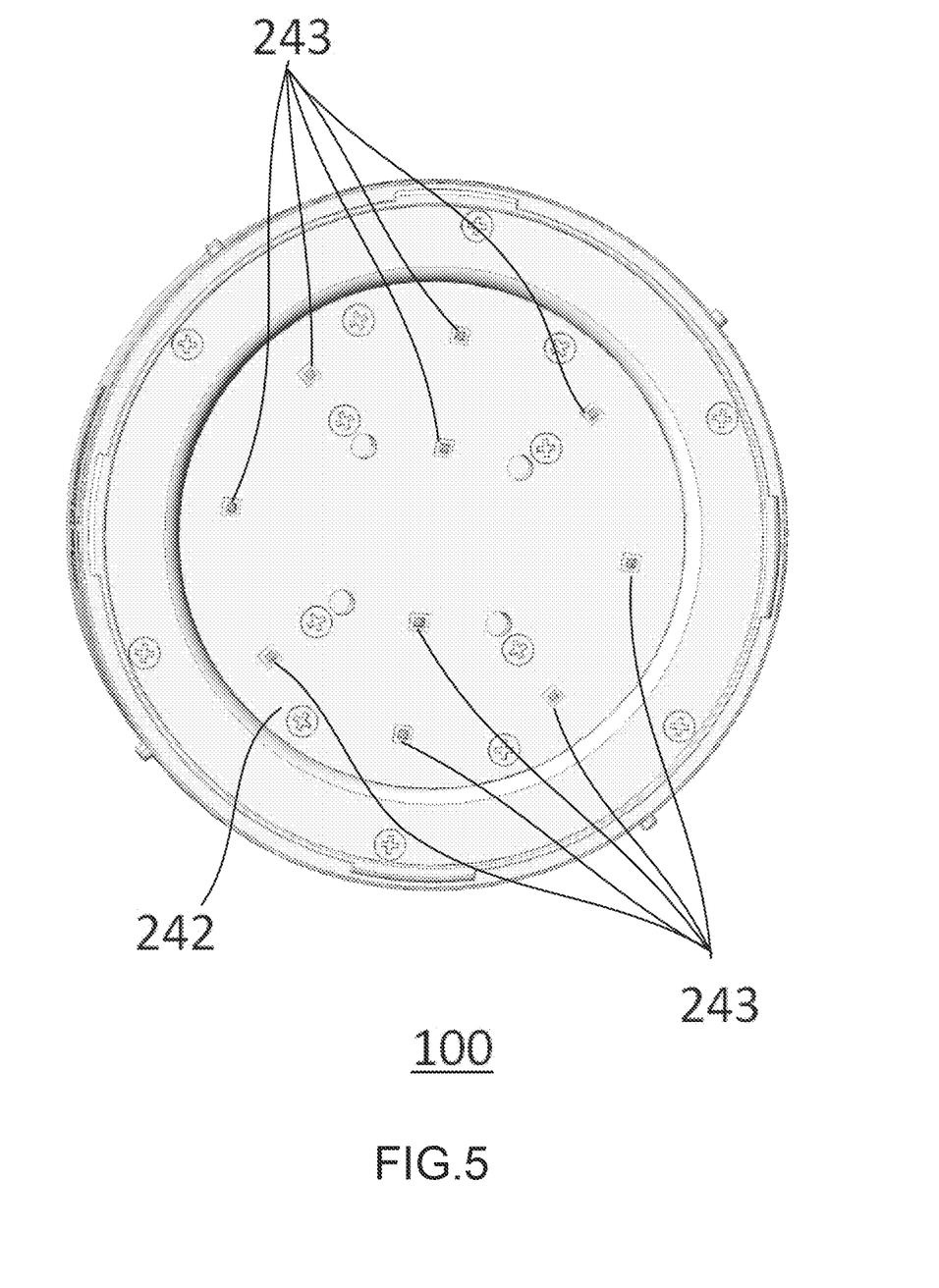
FIG. 5 is a front view of a light-emitting surface in the polymerization apparatus.

Note that the light source assembly 240 is basically the same as the so-called heat sink LED module, and the materials of the base 241 and the heat sink 245, LEDs (which may be packaged), the method of joining the heat sink 245, and the like do not particularly differ from those of the heat sink LED module. However, the shape and area of the base 241 (substantially corresponding to the shape and area of the light-emitting surface 242) is favorably equivalent to the shape and area of the light-transmissive window member 230. Further, the number and arrangement pattern of the plurality of LEDs 243 disposed on the light-emitting surface 242 only need to be appropriately determined so that light is applied to an object with as uniform an illuminance as possible depending on the shape and area of the light-emitting surface 242, the dispersion angle (half-value angle) of the individual LED, or the like. For example, in the case of using an LED with a dispersion angle (half-value angle) of 110 to 140 degrees, the number of unit areas of the light-emitting surface 242 is 0.10 to 0.25 (units/cm$^2$) and the intensity of light per unit area at distances of 30 mm from the light-emitting surface 242 is 20 mW/cm$^2$ to 120 mW/cm$^2$, favorably 30 mW/cm$^2$ to 100 mW/cm$^2$. In the case where the intensity of light is lower than 20 mW/cm$^2$, there is a possibility that the polymerization curing of an object is insufficient. In the case where the strength of light is greater than 120 mW/cm$^2$, there is a possibility that the surface of an object is suddenly polymerized and cured, which causes the object to be deformed. In this embodiment, as shown in FIG. 5, eight LEDs 243 are disposed on the in-plane outer circumferential side of the light-emitting surface 242, and two LEDs 243 are disposed on the inner circumferential side excluding the center portion. Also the arrangement pattern of the LEDs 243 is not particularly limited, and may be radial or matrix.

The heat sink 245 is joined to the heat-dissipating surface 244 on the back side of the light-emitting surface 242. The heat sink 245 is formed of a metal having high thermal conductivity, such as aluminum, and has a structure in which the plurality of heat-dissipating fins 246 is disposed in parallel at predetermined intervals from each other as shown in FIG. 3. The groove-like gap between the adjacent heat-dissipating fins 246 forms the air passage 247, and the light source assembly 240 is cooled when the cooling air passes through the air passage 247 to deprive the heat generated when the LED is driven.

Further, a fan for sending cooling air to the air passage 247 is installed in the light source chamber 220. In the figure, an embodiment using two fans, i.e., the intake fan 250 and the exhaust fan 260, is shown. The intake fan 250 is disposed to face the intake holes 224 and one end of the air passage 247, and the exhaust fan 260 is disposed to face the exhaust holes 225 and the other end of the air passage 247. The cooling air is external air taken in from the intake holes 224 located at positions opposed to the intake fan 250 by driving the intake fan 250. The warmed air after use is exhausted to the outside through the exhaust holes 225 located at positions opposed thereto. In this embodiment, the exhaust fan 260 is additionally added in the above-mentioned air-cooling system and the intake fan 250 and the exhaust fan 260 are driven in synchronization with each other, thereby increasing the cooling air flow rate without using a large fan (increase the volume of air passing through the air passage 247 per unit time). Because a small fan with a small installation space can be used, even in the case where two fans are used, they can be installed in the small space of the light source chamber 220, and the device can be made compact.

Further, in the polymerization apparatus according to this embodiment, the intake fan 250 is disposed so as to face one end of the air passage 247 and the exhaust fan 260 is disposed so as to face the other end of the air passage 247 so that the intake holes 224, the intake fan 250, the air passage 247, the exhaust fan 260, and the exhaust holes 225 are aligned in a straight line. Then, this restricts the flow of air when both fans are driven. That is, by adopting such an arrangement structure, the air heated by absorbing the heat from the heat-dissipating fins 246 is made difficult to spread to a space other than the air passage 247 inside the light source chamber 220. Therefore, by the effect of improving the cooling efficiency by the combined use of the two fans and this flow restriction, it is possible to reduce the heat stress on the device, circuit, or the like, such as the control substrate 280 disposed inside the light source chamber 220. Note that the control substrate 280 as a control means represents a device, a circuit, or the like that controls driving of the plurality of LEDs 243, the intake fan 250, the exhaust fan 260, and the like.

Note that in the polymerization apparatus according to this embodiment, it is favorable to dispose the intake fan 250 so that the largest distance between the inner wall surface of the side walls 221 on which the intake holes 224 are disposed and the air-drawing surface of the intake fan 250 is 20 mm or less, and it is particularly favorable to dispose the intake fan 250 so that the largest distance is 10 mm or less. Although the intake volume of external air is smaller than the maximum air volume of intake fan because of the ventilation resistance generated when external air passes through the intake holes 224, air volume reduction due to ventilation resistance is minimized by disposing the intake fan 250 as described above, and it is possible to take in more external air and improve the cooling efficiency. Further, it is favorable to dispose the exhaust fan 260 so that the maximum distance between the inner wall surface of the side walls 221 on which the exhaust holes 225 is installed and the surface of the exhaust fan 260 from which air is exhausted is 20 mm or less, and it is particularly favorable to dispose the exhaust fan 260 so that the distance is 10 mm or less. As in the case of the intake hole, since ventilation resistance is generated also in the exhaust hole, the exhaust amount of air heated by the air passage 247 is smaller than the maximum air volume of the exhaust fan 260. However, by disposing the exhaust fan 260 as described above, it is possible to minimize the reduction in air volume due to ventilation resistance, highly realize the flow restriction of the cooling air by exhausting more air heated by the air passage 247, and further improve the cooling efficiency. In order to further enhance the same effects, between the intake holes 224 and the intake fan 250 and between the exhaust holes 225 and the exhaust fan 260, an air duct connecting them to each other or a hood for regulating the flow of air may be disposed.

As a drive source (power) of the control substrate 280, a battery (not shown) or power supplied from the outside via an external power cord port 290 is used. Then, the driving of the above-mentioned devices is controlled on the basis of instructions based on operating panels and various switches, which are attached to the first casing 210 of the light irradiator 200 and are not shown, and information from various sensors to be installed as required. Examples of such a switch or sensor include a main power supply switch, a main switch for starting irradiation, a timer switch, a selection switch, an indicator lamp, a light sensor for controlling output, a temperature sensor, a thermistor as a safety device, an inclining switch, a contact switch, and a proximity switch. Further, regarding an example of the control method by the control substrate 280, a method of arbitrarily adjusting the irradiation time by disposing a timer switch on the outer surface of the first casing 210, a method of mounting a microcomputer on the control substrate 280 to control the irradiation time by programming such that, for example, it is automatically turned off 5 minutes or 10 minutes after the start of the irradiation, or the like can be adopted as a control method of the irradiation time. At this time, the programmed irradiation time can be selected by disposing a selection switch on the outer surface of the first casing 210, or can be selected by the number of times the main switch is pressed. Further, as a control method of driving the intake fan 250 and the exhaust fan 260, a method of performing control by programming so as to drive until the temperature detected by the temperature sensor is equal to or lower than a specified temperature, a method of starting driving at the same time as light irradiation starts, and controlling by programming so that driving continues for a fixed time after the light is turned off, or the like can be adopted.

The polymerization vessel 300 includes a polymerization cup 310 and a second casing 320, the polymerization cup 310 having a frustoconical or substantially frustoconical shape that opens upward and increases in diameter upward and being capable of housing the object therein, the second casing 320 being a bottomed cylindrical or box-shaped casing having an opening 321 at the apex thereof, the polymerization cup 310 being attachably/detachably housed in the second casing 320 via the opening 321. Then, light that has been emitted from the plurality of LEDs 243 of the light irradiator 200 and has passed through the light-transmissive window member 230 (activation light) is applied to the inside of the polymerization cup 310.

It is favorable that at least the inner surface of the polymerization cup 310 is formed of a material that reflects the above-mentioned activation light, such as aluminum, stainless steel, metal-plated glass, and a transparent resin. With this, since the polymerization cup 310 has a frustum or substantially frustoconical shape, part of the light reflected by the side surface thereof is reflected on the bottom surface, and thus, light can also be applied to the back side of an object. At this time, it is favorable that the angle of the generatrix with respect to the perpendicular line of the frustoconical or substantially frustoconical shape is 5 to 30 degrees (deg). Further, an upper end periphery 311 of the polymerization cup 310 (the circular or substantially circular opening of the cup) is within the range of the light-transmissive window member 230, and it is favorable that the diameter of the above-mentioned periphery (diameter of the opening) is equal to or slightly smaller than the diameter of the light-transmissive window member 230 in the case where the light-transmissive window member 230 is circular.

As described above, in order to inhibit the so-called surface unpolymerized layer that is inevitably formed by the effect of atmospheric oxygen or the like during polymerization from being formed, it is effective to perform the polymerization in a state where an object is submerged in water or hot water. Therefore, in the polymerization apparatus 100 according to the present invention, it is favorable that water or hot water is injected into the polymerization cup 310 so that the object can be irradiated with light in a state of being immersed in water or hot water. At this time, since the volume of water or hot water required varies depending on the size of the object, it is difficult to adjust the amount of water in the case where water or hot water is placed in a polymerization vessel in advance, because the entire object cannot be immersed if the amount of water is too small and water or hot water may overflow the outside of the cup if the amount of water is too large. In the polymerization apparatus 100 according to the present invention, since the second casing 320 has a double structure that attachably/detachably houses the polymerization cup 310, water or hot water overflowing from the polymerization cup 310 can be received in the gap between the polymerization cup 310 and the second casing 320 even if water or hot water is put into the polymerization cup 310 up to the vicinity of the upper end periphery 311 of the polymerization cup 310 and an object is further put thereinto, and water or the like overflown by removing the polymerization cup 310 after use can be easily discarded. This facilitates the pre-preparation of water or hot water and leads to a reduction of the working time.

Further, in the polymerization vessel 300, it is favorable to provide a positioning means (not shown) to each of the polymerization cup 310 and the second casing 320 in order to cause the activation light transmitted through the light-transmissive window member 230 of the light irradiator 200 to be located at a position such that the activation light enters the polymerization cup 310 reliably and efficiently. Examples of such a positioning means include a means for providing a recess in the bottom surface of the polymerization cup 310, providing a projecting portion corresponding to the second casing 320, and performing positioning by fitting them together, and a means for providing a guide (protrusion) circumscribing the outer periphery of the bottom surface of the polymerization cup 310 to the second casing 320 and performing positioning by the guide.

Note that in the case where an object having an unpolymerized portion formed of a polymerizable curable composition containing a monofunctional polymerizable monomer component having a low molecular weight, which is volatilized by heat of polymerization at the time of polymerization curing, is polymerized as described above, not only the component adheres to the inner surface of the polymerization cup 310 and inhibits the reflection of the activation light, but also in the case where such deposits are deposited, polymerization may occur with the deposits adhering to the object. From the viewpoint of avoiding such a problem, it is favorable to make the polymerization cup 310 removable so that it can be easily cleaned or replaced. Further, a disposable cup (not shown) that is installed in the polymerization cup 310 when the polymerization apparatus 100 is in use, has a shape substantially similar to that of the polymerization cup 310, and has at least the inner surface formed of a material that reflects light emitted from the LEDs 243 can also be used. By performing polymerization by setting the above-mentioned polymerization cup 310 or disposable cup which are not used at the time of use each time, and discarding it after use, it is possible to easily avoid the occurrence of the above-mentioned problem and facilitate the securing of hygiene. Further, the polymerization cup 310 itself may include the disposable cup as described above.

The material of the second casing 320 is not particularly limited, but is usually the same material as that of the first casing 210. Further, the shape and size thereof are not particularly limited as long as the polymerization cup 310 can be attachably/detachably housed. However, it is favorable that the second casing 320 has the shape and size such that it is integrated with the first casing 210 when the upper end periphery 311 of the polymerization cup 310 overlaps below the light-transmissive window member 230 of the light source chamber 220 with a predetermined distance therebetween. In the embodiment shown in the figure, when both are superposed, a cylindrical shape is formed.

Figure 4:
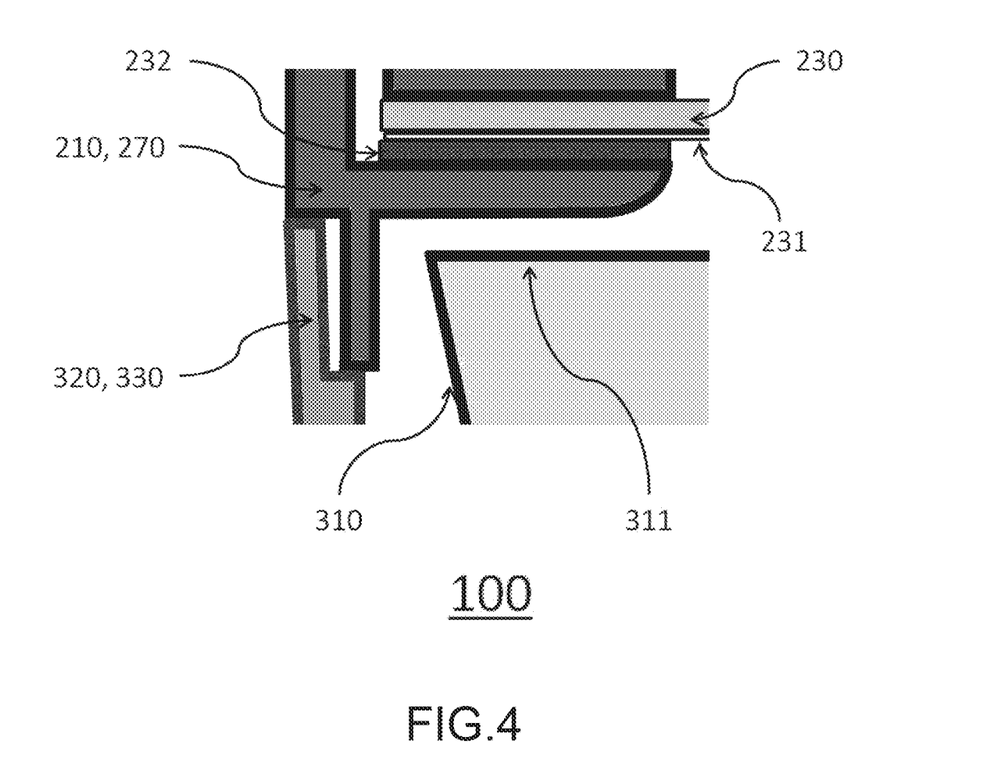
FIG. 4 is a partial enlarged view of FIG. 3.

In order to easily achieve such an integral structure, it is favorable that the light irradiator 200 and the polymerization vessel 300 have integration mechanisms that interact to be capable of integrating the light irradiator 200 and the polymerization vessel 300 such that the upper end periphery 311 of the polymerization cup 310 overlaps below the light-transmissive window member 230 of the light source chamber 220 with a predetermined distance therebetween. Examples of such integration mechanisms include one in which an annular fitting projecting portion is provided slightly inside the outermost periphery of the bottom of the first casing 210 (the back side of the floor 223), which is used as an integration mechanism 270 on the side of the light irradiator 200, and one in which a part in the vicinity of the upper end of the outer peripheral wall of the second casing 320 is thinned and fitted into the fitting projecting portion to form a ledge on which the projecting portion can be placed, which is used as an integration mechanism 330 on the side of the polymerization vessel 300, as shown in FIG. 4. In the case where such integration mechanisms are adopted, in order to avoid heat generated from the LEDs 243 from the polymerization vessel 300 being transmitted to the second casing 320 via the first casing 210 as much as possible, it is favorable that when both of them are integrated, both of the contact portions are formed of a non-metal material such as a synthetic resin, and it is favorable that the contact area is also reduced as much as possible.

As described above, since the polymerization apparatus 100 according to this embodiment uses LEDs as the light source, it can be made compact and is easy to carry, and therefore can be suitably used for denture repair or the like at the time of home-visit medical care. Moreover, since a plurality of LEDs, e.g., 10 LEDs are used as the light source, it is possible to irradiate the surface of an object such as a preliminary molded body of the denture with high intensity. In addition, even though a plurality of LEDs is mounted in a compact device, the heat generated by these LEDs can be effectively dissipated outside the device, and thus, a control device disposed in the device is unlikely to be subject to thermal stress. Further, since non-uniformity of the temperatures in the polymerization vessel can be inhibited, stable and highly accurate polymerization curing can be achieved.

Further, since the polymerization apparatus 100 according to this embodiment uses, as a light source, the plurality of light-emitting diodes (LEDs) 243 disposed on the surface of the base 241 having a relatively large area, the intensity of the irradiation light per unit area in an object can be increased. Moreover, by driving the exhaust fan 260 at the same time as the intake fan 250, the flow path of the cooling air (flow path) is further regulated. As a result, since the heat radiation from the LEDs is increased due to the use of many LEDs in a narrow region although it is possible to increase the light intensity, it is possible to solve problems such as adverse effects on the device for controlling LEDs due to retention of heated air in the device and non-uniformity in polymerizations due to non-uniformity of temperatures in the polymerization vessel even in the case where an air cooling mechanism using a cooling fan is adopted.

Further, even in the case where an object has an unpolymerized portion formed of a polymerizable curable composition containing a monofunctional polymerizable monomer component having a low molecular weight, which is volatilized by heat of polymerization at the time of polymerization curing, and the component is adhered to the light-transmissive window member or the polymerization vessel and solidified, since the protective film and polymerization cup can be easily removed and replaced, the labor and costs of replacing the window material can be greatly reduced as compared with the case of replacing the window material.

Although the polymerization apparatus according to the present invention has been described above on the basis of the drawings, it goes without saying that various modification can be made without departing from the essence of the present invention. For example, the integration mechanisms can be appropriately changed in accordance with the shapes of the first casing and the second casing, or the like. The second casing may be of the drawer type so as to fit in the first casing, the drawer may be closed after an object is housed in the polymerization cup with the drawer open, and the upper end periphery of the polymerization cup may overlap below the light-transmissive window member with a predetermined distance therebetween with the drawer closed.

REFERENCE SIGNS LIST

100 polymerization apparatus
200 light irradiator
210 first casing
220 light source chamber
221 side wall
222 ceiling
223 floor
224 intake hole
225 exhaust hole
230 light-transmissive window member 231 protective film
232 gasket
240 light source assembly
241 base
242 light-emitting surface
243 LED
244 heat-dissipating surface
245 heat sink
246 heat-dissipating fin
247 air passage
250 intake fan
260 exhaust fan
270 integration mechanism(light irradiator side)
280 control means
290 external power cord port
300 polymerization vessel
310 polymerization cup
311 upper end periphery of polymerization cup
320 second casing
321 opening
330 integration mechanism(polymerization vessel side)

The invention claimed is:

1. A polymerization apparatus, comprising:
a light irradiator; and
a polymerization vessel, the polymerization apparatus being for polymerizing an unpolymerized portion formed of a photopolymerization curable composition by applying light emitted from the light irradiator to an object that includes a member or an article having the unpolymerized portion housed inside the polymerization vessel,
wherein the light irradiator includes
a first casing that includes a light source chamber defined by cylindrical side walls, a ceiling, and a floor including a light-transmissive window member, an intake hole and an exhaust hole being provided on the side walls,
a light source assembly that includes a base having a light-emitting surface on which a plurality of light-emitting diodes is disposed in a predetermined pattern and a heat-dissipating surface to which a heat sink is joined, the heat sink further including a plurality of heat-dissipating fins disposed in parallel at predetermined intervals to form a groove-like air passage between the heat-dissipating fins adjacent to each other, the light source assembly being disposed within the light source chamber so that the light-emitting surface faces the light-transmissive window member,
an intake fan disposed within the light source chamber so as to face the intake hole and one end of the air passage, and
an exhaust fan disposed within the light source chamber so as to face the exhaust hole and the other end of the air passage,
the polymerization vessel includes
a polymerization cup that has a frustoconical or substantially frustoconical shape that opens upward and increases in diameter upward, and is capable of housing an object therein, and
a second casing that is a bottomed cylindrical or box-shaped casing having an opening at an apex thereof, the polymerization cup being attachably/detachably housed in the second casing via the opening, and
light that has been emitted by the plurality of light-emitting diodes of the light irradiator and has passed through the light-transmissive window member is applied to the inside of the polymerization cup of the polymerization vessel.

2. The polymerization apparatus according to claim 1, wherein
the light irradiator further includes a light-transmissive protective film covering an externally exposed portion of the light source chamber in the light-transmissive window member.

3. The polymerization apparatus according to claim 2, wherein
the polymerization cup is a disposable cup having at least an inner surface formed of a material that reflects light emitted from the light-emitting diodes.

4. The polymerization apparatus according to claim 1, wherein
a cross section of the cylindrical side chamber of the light source chamber is circular, substantially circular, elliptical, substantially elliptical, or polygonal.

5. The polymerization apparatus according to claim 1, wherein
the light irradiator further includes a control means disposed in the light source chamber, and
the control means controls driving of at least one selected from the group consisting of the plurality of light-emitting diodes, the intake fan, and the exhaust fan by using electric power supplied from a battery or an external power source.

6. The polymerization apparatus according to claim 1, wherein
the light irradiator and the polymerization vessel have integration mechanisms that interact to integrate the light irradiator and the polymerization vessel such that an upper end periphery of the polymerization cup overlaps below the light-transmissive window member of the light source chamber with a predetermined distance therebetween.

7. The polymerization apparatus according to claim 6, wherein the integration mechanisms are contact portions of the light irradiator and the polymerization vessel when the light irradiator and the polymerization vessel are integrated, each of the contact portions being formed of a non-metallic material.

* * * * *